(12) United States Patent
Mizuno

(10) Patent No.: US 9,093,221 B2
(45) Date of Patent: Jul. 28, 2015

(54) CERAMIC POWDER AND MULTI-LAYER CERAMIC CAPACITOR

(71) Applicant: TAIYO YUDEN CO., LTD., Taito-ku, Tokyo (JP)

(72) Inventor: Youichi Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 200 days.

(21) Appl. No.: 13/849,368

(22) Filed: Mar. 22, 2013

(65) Prior Publication Data

US 2013/0258548 A1    Oct. 3, 2013

(30) Foreign Application Priority Data

Mar. 30, 2012 (JP) ................. 2012-080788

(51) Int. Cl.

| | |
|---|---|
| *C01G 25/00* | (2006.01) |
| *H01G 4/12* | (2006.01) |
| *H01G 4/30* | (2006.01) |
| *C04B 35/468* | (2006.01) |
| *B32B 18/00* | (2006.01) |
| *C01G 23/00* | (2006.01) |
| *B82Y 30/00* | (2011.01) |

(52) U.S. Cl.
CPC .............. *H01G 4/1227* (2013.01); *B32B 18/00* (2013.01); *B82Y 30/00* (2013.01); *C01G 23/006* (2013.01); *C04B 35/4682* (2013.01); *H01G 4/30* (2013.01); *C01P 2002/01* (2013.01); *C01P 2002/34* (2013.01); *C01P 2002/72* (2013.01); *C01P 2004/03* (2013.01); *C01P 2004/62* (2013.01); *C01P 2004/64* (2013.01); *C04B 2235/3236* (2013.01); *C04B 2235/5445* (2013.01); *C04B 2235/5454* (2013.01); *C04B 2235/761* (2013.01); *C04B 2237/346* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 3,472,614 | A | 10/1969 | Jugle |
| 7,271,114 | B2 | 9/2007 | Kawamura et al. |
| 7,566,439 | B2 | 7/2009 | Kawamura et al. |
| 7,572,406 | B2 | 8/2009 | Kawamura et al. |
| 2006/0221550 | A1 | 10/2006 | Ryu et al. |
| 2009/0103238 | A1 | 4/2009 | Ryu et al. |
| 2010/0135937 | A1 | 6/2010 | O'Brien et al. |

FOREIGN PATENT DOCUMENTS

| | | |
|---|---|---|
| CN | 1532167 A | 9/2004 |
| CN | 1770341 A | 5/2006 |
| JP | 2005-289668 A | 10/2005 |
| JP | 2006-273708 A | 10/2006 |
| JP | 2008-222522 A | 9/2008 |
| JP | 2011-132071 A | 7/2011 |
| JP | 2012-062229 A | 3/2012 |

OTHER PUBLICATIONS

A Notification of First Office Action issued by the State Intellectual Property Office of China, mailed Mar. 27, 2014, for Chinese counterpart application No. 201310104032.1.
Song Xiangyun, "Twin and Twin Boundary in PTC BaTiO3 Ceramics", Academia Sinica Journa, Oct. 31, 1991, p. 385-388, vol. 19, No. 5.
Rečnik, A. and Kolar, D., Exaggerated Growth of Hexagonal Barium Titanate under Reducing Sintering Conditions, Journal of the American Ceramic Society, Apr. 1996, p. 1015-1018, vol. 79-Issue No. 4, Blackwell Publishing Inc., Malden, MA, USA.

*Primary Examiner* — Steven Bos
(74) *Attorney, Agent, or Firm* — Law Office of Katsuhiro Arai

(57) ABSTRACT

A ceramic powder that contains, as a main composition, barium titanate powder having a perovskite structure with an average particle size (median size) of 200 nm or smaller as measured by SEM observation, wherein the barium titanate powder is such that the percentage of barium titanate particle having twin defects in the barium titanate powder is less than 10% as measured by TEM observation and that its crystal lattice c/a is 1.0075 or more. The ceramic powder is particularly useful in the formation of thin dielectric layers of 1 μm or less and can be used to manufacture MLCCs having both desired capacity and longevity traits.

8 Claims, 1 Drawing Sheet

CERAMIC POWDER AND MULTI-LAYER CERAMIC CAPACITOR

BACKGROUND

1. Field of the Invention

The present invention relates to a ceramic powder that contains barium titanate having a perovskite structure, and a multi-layer ceramic capacitor (MLCC) obtained by using said ceramic powder, particularly useful for a MLCC using a thin-layer dielectric layer.

2. Description of the Related Art

Multi-layer ceramic capacitors (MLCCs) are used in various electronic devices including mobile devices and communications devices.

The trend for smaller, higher-performance MLCCs and other electronic components has been prominent in recent years and, in the case of MLCCs, for example, these capacitors are becoming significantly smaller and larger in capacity. The capacity of a MLCC is proportional to the number of dielectric layers constituting the base material of the MLCC, and inversely proportional to the thickness per dielectric layer, and consequently it is desirable to keep the dielectric layer thin, such as 1 μm or less, and increase the number of layers.

For the material ceramic powder with which to form such dielectric layer, barium titanate powder having a perovskite structure is widely used.

To ensure performance and reliability, and also from the viewpoint of physical characteristics, it is important that the barium titanate powder consist of fine particles so as to make the aforementioned dielectric layer thinner.

According to Patent Literature 1, the powder of barium titanate compound obtained by the method described therein has an average particle size of 100 nm or smaller, contains twin defects in at least 10% of the particles, and its standard deviation of particle size distribution is 20 or less.

BACKGROUND ART LITERATURE

Patent Literature

[Patent Literature 1] Japanese Patent Laid-open No. 2011-132071

SUMMARY

However, although making ceramic powder finer, as is the case with the ceramic powder obtained according to the method described in Patent Literature 1, increases the number of grain-boundary particles per dielectric layer that play an important role in the longevity traits of the MLCC and thereby improves the longevity traits of the MLCC, finer ceramic powder means greater surface area and lower dielectric constant (sizing effect of barium titanate).

This means that, in order to obtain the same capacitance that can be achieved with powder of normal particle size, the thickness of the dielectric layer must be reduced, and as a result the DC electric field applied per the unit thickness of dielectric layer rises and the longevity traits of the MLCC worsens. This gives rise to a need for MLCCs offering desired capacity and longevity traits at the same time.

Accordingly, an object of the present invention is to provide a ceramic powder whose main ingredient is barium titanate having a perovskite structure, wherein said powder is particularly useful in the formation of thin dielectric layers of 1 μm or less and can be used to manufacture MLCCs having both desired capacity and longevity traits, so that MLCC products offering excellent capacity and longevity traits can be provided.

The inventor of the present invention completed the present invention after discovering that such problems could be resolved by a ceramic powder which has a specific average particle size or smaller, exhibits twin defects by less than a specific percentage, and contains barium titanate of high tetragonality whose crystal lattice c/a is at or above a specific value.

In other words, the present invention is a ceramic powder that contains barium titanate having a perovskite structure, with an average particle size (median size) of 200 nm or smaller as measured by SEM observation, wherein said ceramic powder is such that the percentage of twin defects in the barium titanate is less than 10% as measured by TEM observation and that its crystal lattice c/a is 1.0075 or more.

Preferably the barium titanate has a percentage of twin defects of 5 to 9%, crystal lattice c/a of 1.0075 to 1.0104, and average particle size of 80 to 150 nm. By using the ceramic powder proposed by the present invention, which meets the above ranges, MLCCs offering excellent capacity and longevity traits can be produced.

Furthermore, the MLCC proposed by the present invention is made by alternately layering a dielectric layer constituted by a sintered body of the ceramic powder proposed by the present invention, and an internal electrode layer.

According to the present invention, a ceramic powder is provided whose main ingredient is barium titanate, wherein said powder is particularly useful in the formation of thin dielectric layers of 1 μm or less and can be used to manufacture MLCCs having both desired capacity and longevity traits, so that MLCC products offering excellent capacity and longevity traits can be provided by using this ceramic powder.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
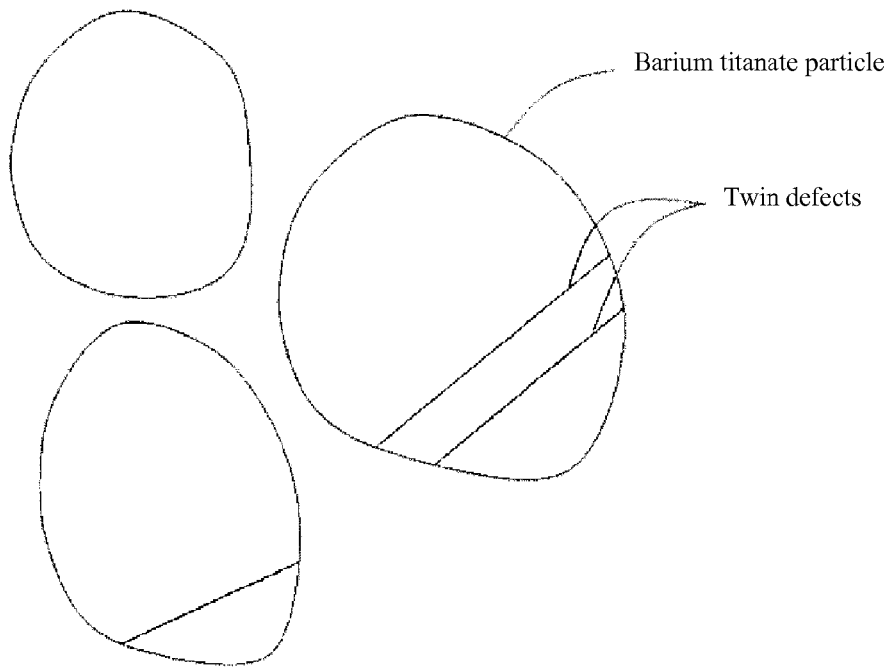
FIG. 1 is a simple drawing showing a barium titanate particle in which twin defects are formed.

1 Multi-layer ceramic capacitor
10 Ceramic sintered body
11 Laminate
12 Dielectric layer
13 Internal electrode layer
15 Cover layer
20 External electrode

DETAILED DESCRIPTION OF EMBODIMENTS

As mentioned above, the ceramic powder proposed by the present invention contains barium titanate having a perovskite structure, and the average particle size (median size) of the barium titanate as measured by observation using a scanning electron microscope (SEM) is 200 nm or less. The particle size can be the maximum width of the particle observed with SEM. The median size is the particle size of the median particle (d50) when counting particles in the order of the size.

The aforementioned average particle size can be obtained by observing a powder sample of barium titanate using a SEM wherein n=500 (measuring 500 particles), and then taking the median size of the measured particles. The 500 particles can be selected randomly or can be all the particles observed in a randomly selected region or regions.

If the average particle size is 200 nm or larger, a smooth and highly reliable dielectric layer of 1 µm or less in thickness cannot be obtained.

Additionally, the average particle size is normally 80 nm or more, or preferably 80 to 150 nm from the viewpoint of obtaining a thin dielectric layer. How to adjust the average particle size will be described later.

Next, the aforementioned barium titanate having a perovskite structure has a percentage of twin defects, as measured by observation using a transmission electron microscope (TEM), of less than 10%. The percentage of twin defects is measured by observing a powder of the barium titanate using a TEM and counting, among 100 particles (n=100 wherein the 100 particles can be selected randomly or can be all the particles observed in a randomly selected region or regions), those particles in which twin defects are formed. FIG. 1 shows a schematic drawing of a barium titanate particle in which twin defects are formed (the right particle with two lines).

From this viewpoint of achieving the intended effect of the present invention, preferably the aforementioned percentage of twin defects is 5 to 9%. How to adjust the percentage of twin defects will be described later.

As mentioned above, the crystal lattice c/a of the barium titanate having a perovskite structure is 1.0075 or more. The c/a can be obtained by measuring the diffraction peak of the barium titanate (as a barium titanate powder sample in its entirety) according to any known powder X-ray diffraction method, analyzing the obtained diffraction peak according to the Rietveld method, and then calculating the lattice constants for axis a and axis c.

Such ceramic powder proposed by the present invention, having high tetragonality of barium titanate and a certain average particle size or smaller, can achieve both desired dielectric constant and accelerated life and these characteristics can be used to manufacture MLCCs offering excellent capacity and longevity traits. In this disclosure, the "ceramic powder" contains the "barium titanate powder" as a main or predominant composition, consists essentially of the "barium titanate powder", is characterized by the "barium titanate powder", or is equivalent to the "barium titanate powder".

From the above viewpoints, preferably the c/a is 1.0075 to 1.0104. How to adjust the c/a will be described later.

Next, how to manufacture the ceramic powder proposed by the present invention is explained. The manufacturing method is not limited in any way, so long as the barium titanate constituting the main ingredient of the powder meets the various parameters explained above. However, the powder can be manufactured as described below by considering and adjusting the various conditions and factors, for example.

In general, titanium material and barium material are reacted with each other to synthesize barium titanate, which is then heat-treated and sintered into a ceramic powder, after which the powder is crushed to adjust the particle size as necessary and, if necessary, the crushed powder is further mixed with various additive compounds.

Various methods have been known to synthesize the aforementioned barium titanate, where examples include the sol-gel method, hydrothermal method, and solid phase method.

Among these methods, the sol-gel method and hydrothermal method tend to suppress generation of twin defects and lower the c/a value.

The solid phase method tends to generate more twin defects and raise the c/a value.

To keep the percentage of twin defects at less than 10%, it is desirable, under the present invention, to adopt the hydrothermal method.

In addition, the c/a value tends to rise if the ratio of barium and titanium (Ba/Ti) in the synthesized barium titanate is slightly greater than the stoichiometric level, or it tends to drop if this ratio is slightly lower than the stoichiometric level. This ratio does not affect the percentage of twin defects much.

Furthermore, under the present invention, preferably the aforementioned heat treatment is implemented in two separate stages of hydrothermal treatment and heat treatment.

If the temperature or time of the aforementioned heat treatment is higher or longer, the percentage of twin defect generation increases and the c/a value tends to rise. Conversely if the temperature or time of heat treatment is lower or shorter, generation of twin defects is suppressed and the c/a value tends to drop.

By adding heat treatment, barium titanate is sintered and the particle grows in size, and consequently barium titanate powder having a desired average particle size can be obtained. This heat treatment also increases the percentage of twin defects in barium titanate as well as the c/a value of its crystal lattice.

Conditions of the aforementioned heat treatment are not limited in any way, but the heat treatment, normally, is performed under the conditions of 500 to 1200° C. for 0.5 to 4 hours, or preferably under the conditions of 780 to 870° C. for 2 to 3 hours. This heat treatment may be performed in atmosphere or in an ambience of $N_2$, etc.

By providing heat treatment at a specific temperature for a specified time as mentioned above, the level of particle growth can be controlled and a desired average particle size can be achieved. While the average particle size of barium titanate powder is normally 10 to 85 nm before sintering, this heat treatment (sintering) increases the size normally to as much as 80 to 200 nm and makes the dielectric constant higher.

The heat treatment explained above adjusts the percentage of twin defects in barium titanate and raises the c/a value of crystal lattice.

The barium titanate that has undergone the aforementioned heat treatment (sintering) is then put through hydrothermal treatment. This hydrothermal treatment is realized by introducing the aforementioned barium titanate powder into water or specified aqueous solution or other liquid and then adding thermal energy to the powder using the liquid as the medium.

Preferably the hydrothermal treatment temperature is 100° C. or higher, because the tetragonality of barium titanate is not expected to increase much when this temperature is lower than 100° C. The hydrothermal treatment temperature is normally 200° C. or lower.

The hydrothermal treatment time is not limited in any way, but at least one hour of hydrothermal treatment is enough and normally the treatment time is 24 hours or less.

As for the pressure of hydrothermal treatment, sufficient effects can be expected at a pressure of at least 1 MPa, and the pH of hydrothermal treatment is normally 12 to 12.5.

In addition, while the liquid for hydrothermal treatment may be water, it is preferable to use an aqueous solution that contains A-site metal ions of the aforementioned barium titanate having a perovskite structure, or specifically barium ions, to a certain concentration, or desirable to use an aqueous solution that contains A-site metal ions by at least 0.1 times the mole number of A-site metal contained in the powder to be treated.

After the hydrothermal treatment, barium titanate powder is dried and then crushed to adjust the particle size, as necessary, or crushing is combined with classification to regulate the particle size.

This crushing can be done using either a wet method or dry method, but dry crushing is preferred from the viewpoint of drying cohesion. Note, however, that dry crushing tends to lower the c/a value. It does not affect the percentage of twin defects much.

Under the present invention, individual conditions, etc., are adjusted/set as deemed appropriate, with an understanding of what each of the above operations tends to do, to manufacture a barium titanate powder having a perovskite structure and meeting the average particle size, percentage of twin defects and c/a value as specified under the present invention.

Particularly under the present invention, it is preferable to obtain a barium titanate powder by: manufacturing barium titanate according to the hydrothermal method; heat-treating the manufactured barium titanate under the conditions of 500 to 1200° C. for 0.5 to 4 hours; hydrothermally treating the heat-treated barium titanate under the conditions of 100 to 200° C. for 1 to 24 hours at a pH of 12 to 12.5; and dry-crushing the hydrothermally treated barium titanate as necessary.

The ceramic powder proposed by the present invention contains a barium titanate powder obtained in the manner described above, for example, and it also contains various additive compounds as necessary, as described later.

For example, the ceramic powder proposed by the present invention, being obtained as explained above, has a small average particle size and this characteristic can be used to manufacture high-quality MLCCs having a dielectric layer of 1 μm or less in thickness. Manufactured MLCCs have sufficient capacitance and offer excellent product longevity traits.

The ceramic powder proposed by the present invention contains a barium titanate powder obtained in the manner described above, for example, and it also contains various additive compounds as necessary, as described later.

For example, the ceramic powder proposed by the present invention, being obtained as explained above, has a wide range of optimum sintering temperatures and a small average particle size, and these characteristics can be used to manufacture, at a high yield, high-quality MLCCs having a dielectric layer of 1 μm or less in thickness. Manufactured MLCCs have sufficient capacitance, present less capacitance variation among individual products, and are resistant to defects.

Figure 2:
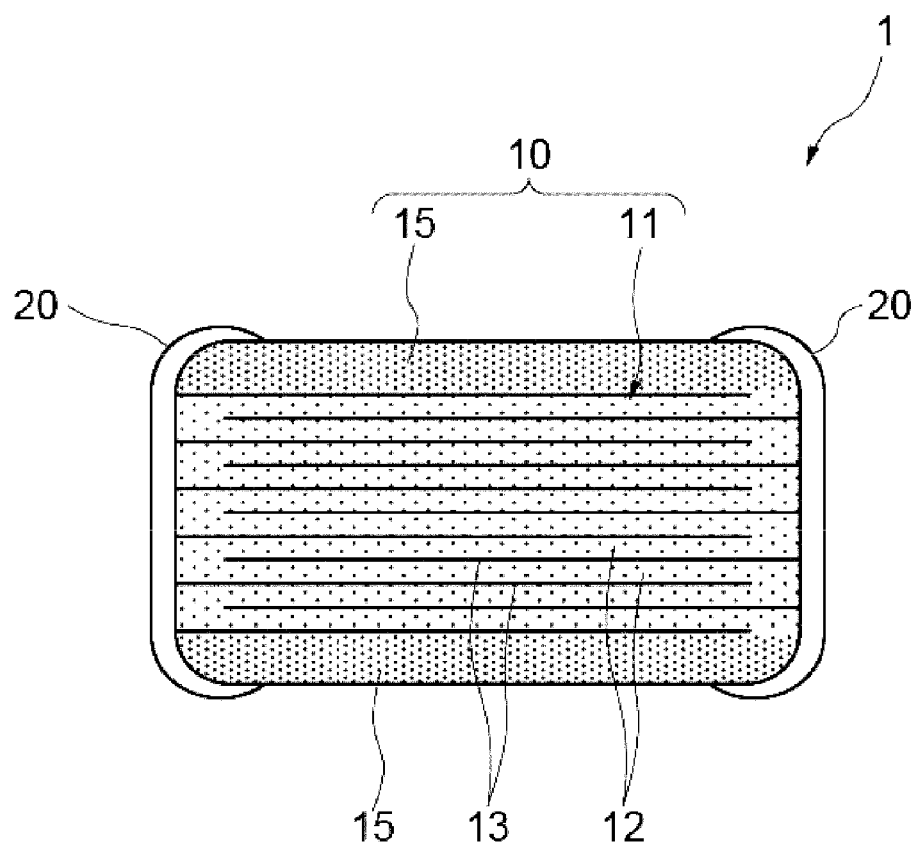
FIG. 2 is a schematic longitudinal cross-section view of a multi-layer ceramic capacitor conforming to the present invention.

Next, a multi-layer ceramic capacitor according to an embodiment of the present invention is explained. FIG. 2 is a schematic longitudinal cross-section view of a multi-layer ceramic capacitor 1 conforming to the present invention.

The multi-layer ceramic capacitor 1 is generally constituted by a ceramic sintered body 10 having standard chip dimensions and shape (such as a rectangular solid of 1.0×0.5× 0.5 mm), and a pair of external electrodes 20 formed on both sides of the ceramic sintered body 10. The ceramic sintered body 10, whose main ingredient is barium titanate particle crystal, has a laminate 11 formed by alternately layering dielectric layers 12 and internal electrode layers 13 inside, and cover layers 15 formed as the outermost layers provided at the top and bottom in the laminating direction.

The laminate 11, where each dielectric layer 12 sandwiched by two internal electrode layers 13 has a thickness of 1 μm or less (such as approx. 900 nm) according to the specifications of capacitance and required pressure resistance, etc., has a high-density, multi-layer structure comprising several dozen to several hundred layers in total.

The cover layers 15 formed as the outermost layers of the laminate 11 protect the dielectric layers 12 and internal electrode layers 13 from external contamination due to humidity, contaminants, etc., and prevent deterioration of these layers over time.

The multi-layer ceramic capacitor 1 is manufactured as follows, for example. First, a material fine-particle powder whose main ingredient is barium titanate is wet-mixed with additive compounds, after which the mixture is dried and crushed to prepare a dielectric powder (ceramic powder conforming to the present invention). Examples of the additive compounds include oxides of Mg, Y, Sm, Eu, Gd, Tb, Dy, Ho, Er, Tm, Yb, Cr, V, Mn, Co, Ni, Nb, Ta, Mo, W, Si, Li, B, Na and K, among others. These additive compounds, normally, are added by 0.01 to 0.1 mol in total, per 1 mol of barium titanate.

The prepared dielectric powder is wet-mixed using a binder such as polyvinyl butyral resin, and an organic solvent such as ethanol, after which the mixture is coated on a base material in a band form as a dielectric green sheet of 1 μm or less in thickness according to the die-coater method, doctor blade method, etc., and then dried. Next, a metal conductive paste containing organic binder is printed on the surface of the dielectric green sheet by means of screen printing or gravure printing, to place an internal electrode layer 13 pattern. For the aforementioned metal, nickel is widely used from the viewpoint of cost.

It is possible to uniformly disperse barium titanate with an average particle size of 50 nm or less, in the aforementioned metal conductive paste, as a co-material. Thereafter, a specified number of dielectric green sheets, which have been stamped out to an identical size of 15 cm×15 cm, for example, are layered so that the internal electrode layers 13 and dielectric layers 12 alternate. Cover sheets that will become cover layers 15 are then pressure-bonded at the top and bottom of the layered dielectric green sheets, after which the laminate is cut to specified chip dimensions (such as 1.0 mm×0.5 mm) and then a Ni conductive paste that will form external electrodes 20 is coated on both side faces of the laminate and dried. This way, a molding of multi-layer ceramic capacitor 1 is obtained.

The molding of multi-layer ceramic capacitor 1 thus obtained is placed in a $N_2$ ambience of approx. 350° C. to remove the binder, and then sintered for 10 minutes to 2 hours at 1100 to 1280° C. under a mixed gas containing $N_2$, $H_2$ and $H_2O$ (whose oxygen partial pressure is approx. $1.0×10^{-11}$ MPa), to obtain a multi-layer ceramic capacitor 1.

In the obtained multi-layer ceramic capacitor 1, the internal electrode layers 13 are embedded in such a way that their edges are exposed alternately at both end faces of the dielectric layers 12 in the length direction, where the exposed edges of internal electrode layers 13 are connected to the external electrodes 20.

Also, the thickness of the dielectric layer 12 is normally 3 μm or less, or preferably 0.5 to 1 μm, while the thickness of the internal electrode layer 13 is normally 0.5 to 3 μm. With the ceramic powder proposed by the present invention, the average particle size of its main ingredient, or specifically barium titanate, is controlled to 200 nm or less, and therefore a surface of excellent smoothness can be achieved even on such thin dielectric layer, and consequently a multi-layer ceramic capacitor resistant to shorting and other problems can be obtained.

Furthermore, the aforementioned sintering forms particles of a core-shell structure, where each particle has a core of barium titanate being the main ingredient of the aforementioned dielectric powder, and a shell constituted by the aforementioned additive compounds and solid solution of barium titanate, and this structure adds favorable temperature characteristics to the dielectric layer and keeps changes in capacitance and other performance-related characteristics to a minimum or none, even when the MLCC is subject to changing ambient temperatures.

EXAMPLES

Example 1

A barium titanate powder having a perovskite structure was obtained according to the method described below.

First, barium hydroxide salt was mixed into a slurry in which titanium oxide particles of 50 nm in average particle size were dispersed, and the mixture was put through hydrothermal reaction under the conditions of 120° C. for 48 hours at a pH of 13, to obtain a barium titanate powder.

Thereafter, this powder was heat-treated (sintered) under the conditions of 800° C. for 3 hours in a $N_2$ ambience, and then the heat-treated powder was hydrothermally treated again under the conditions of 100° C. for 24 hours at a pH of 12. The obtained barium titanate had a barium-titanate (Ba/Ti) ratio of 1.0010, average particle size of 125 nm, overall percentage of twin defects containing particles of 9%, and c/a of 1.0085.

As for the average particle size, a powder sample was observed using a SEM and sizes of 500 particles were measured, and the median size (diameter) was taken as the average particle size.

The percentage of twin defects was obtained by observing a powder sample using a TEM and counting, among 100 particles, those particles in which twin defects were formed.

Furthermore, the c/a was obtained by X-ray diffraction measurement of powder, followed by the Rietveld analysis.

The obtained barium titanate powder was used as the material to obtain a ceramic powder based on a X7R dielectric composition {(100BaTiO$_3$-1.25Ho$_2$O$_3$-1.2MgO-0.25MnO$_2$-1.3SiO$_2$); the unit is mol}, after which a MLCC molding was prepared using a normal method and then sintered in a sintering furnace in a $N_2$-based ambience of 0.75% in $H_2$ concentration, at a sintering temperature of 1200° C., to prepare a MLCC (in the form of 1.0×1.0×0.5 mm) having 50 dielectric layers, 51 nickel internal electrode layers, and thickness per dielectric layer of 1 μm.

When the prepared MLCC was evaluated for electrical characteristics (specific dielectric constant, dielectric loss and life), the specific dielectric constant (∈γ) was 3250, dielectric loss (tan δ) was 3.50%, and mean time to failure during the accelerated longevity test was 560 minutes (n=100).

The accelerated longevity test was conducted under the conditions of 105° C. and E=50 V/μm. As for the relationship of specific dielectric constant and life, the test result under these conditions was given a "Pass" (O) when the relationship of $y \geq 10^{20} \times x^{-5}$ was established, where y represents the mean time to failure and x represents the specific dielectric constant.

The above results are summarized in Tables 1 and 2 below. It should be noted that a TEM structural analysis of sintered MLCCs found that the measured MLCCs contained twin defects at a percentage equivalent to the percentage of twin defects in the material ceramic powder used in the manufacture thereof.

Comparative Example 1

Barium hydroxide salt was mixed into a slurry in which titanium oxide particles of 50 nm in average particle size were dispersed, and the mixture was put through hydrothermal reaction under the conditions of 120° C. for 48 hours at a pH of 13, to obtain a barium titanate powder.

Thereafter, this barium titanate powder was heat-treated (sintered) under the conditions of 800° C. for 3 hours in a $N_2$ ambience, and then the sintered barium titanate powder was hydrothermally treated under the conditions of 100° C. for 24 hours at a pH of 12.

The obtained barium titanate was crushed using an air-jet type dry crusher (Jet Mill), to obtain a barium titanate powder. The obtained barium titanate had a barium-titanate (Ba/Ti) ratio of 1.0010, average particle size of 115 nm, overall percentage of twin defects containing particles of 9%, and c/a of 1.0073.

This barium titanate powder was used as the material to prepare a ceramic powder based on the same composition as in Example 1, which was then used to obtain a MLCC molding under a normal method, and the obtained molding was sintered in a sintering furnace under the same conditions as in Example 1, to prepare a MLCC having 50 dielectric layers, 51 nickel internal electrode layers and thickness per dielectric layer of 1 μm. When the obtained MLCC was evaluated for electrical characteristics, the specific dielectric constant (∈γ) was 3250, dielectric loss (tan δ) was 7.20%, and mean time to failure during the accelerated longevity test was 260 minutes, indicating that the MLCC had insufficient longevity traits.

The above results are summarized in Tables 1 and 2 below. It should be noted that a TEM structural analysis of sintered MLCCs found that the measured MLCCs contained twin defects at a percentage equivalent to the percentage of twin defects in the material ceramic powder used in the manufacture thereof.

Examples 2 to 6, Comparative Examples 2 to 5

Barium titanate powders were manufactured in the same manner as in Example 1, except that the hydrothermal reaction conditions in the synthesis of barium titanate, average particle size before/after heat treatment, various heat treatment conditions, crushing conditions, barium-titanate (Ba/Ti) ratio, generation ratio of twin defects, and c/a value, were changed as shown in Table 1 below.

The obtained barium titanate powder was used as the material to prepare a ceramic powder based on the same composition as in Example 1, which was then used to obtain a MLCC molding under a normal method, and the obtained molding was sintered in a sintering furnace under the same conditions as in Example 1, to prepare a MLCC having 51 nickel internal electrode layers and thickness per dielectric layer of 1 μm. The obtained MLCC was evaluated for electrical characteristics.

The results are shown in Table 2 below. It should be noted that, in all examples, a TEM structural analysis of sintered MLCCs found that the measured MLCCs contained twin defects at a percentage equivalent to the percentage of twin defects in the material ceramic powder used in the manufacture thereof.

A comparison of Example 1 and Comparative Example, for example, 1 shows that crushing reduces the average particle size of barium titanate powder and also reduces the c/a without affecting the percentage of twin defects.

Additionally, Comparative Example 5 shows that the desired c/a cannot be achieved, depending on the manufacturing conditions for barium titanate powder.

TABLE 2

| | εr | Tan δ (%) | Mean time to failure (minutes) in accelerated longevity test | Pass/fail in accelerated longevity test [y ≥ 20 × ^(−5)] |
|---|---|---|---|---|
| Example [1] | 3,250 | 3.50% | 560 | ○ |
| Comparative Example [1] | 3,250 | 7.20% | 260 | X |

TABLE 1

| | Material Ti source | Treatment [1] Hydrothermal reaction | Treatment [2] Solid phase reaction | Treatment [3] Hydrothermal treatment | Dry crushing | Ba/Ti | Average particle size nm | Percentage of twin defects % | c/a |
|---|---|---|---|---|---|---|---|---|---|
| Example [1] | TiO2/ 50 nm | 120° C./ 48 hours/ pH of 13 | 800° C./ 3 hours/ $N_2$ ambience | 100° C./ 24 hours/ pH of 12 | None | 1.0010 | 125 | 9% | 1.0085 |
| Comparative Example [1] | TiO2/ 50 nm | 120° C./ 48 hours/ pH of 13 | 800° C./ 3 hours/ $N_2$ ambience | 100° C./ 24 hours/ pH of 12 | Performed | 1.0010 | 115 | 9% | 1.0073 |
| Comparative Example [2] | TiO2/ 45 nm | 120° C./ 12 hours/ pH of 12 | 870° C./ 3 hours/ $N_2$ ambience | 100° C./ 12 hours/ pH of 12 | None | 0.9998 | 120 | 12% | 1.0078 |
| Comparative Example [3] | TiO2/ 45 nm | 120° C./ 12 hours/ pH of 12 | 870° C./ 2 hours/ $N_2$ ambience | 100° C./ 12 hours/ pH of 12 | Performed | 0.9998 | 110 | 12% | 1.0072 |
| Example [2] | TiO2/ 85 nm | 130° C./ 36 hours/ pH of 13.5 | 815° C./ 2 hours/ $N_2$ ambience | 100° C./ 24 hours/ pH of 12 | None | 1.0015 | 150 | 5% | 1.0091 |
| Example [3] | TiO2/ 85 nm | 130° C./ 36 hours/ pH of 13.5 | 815° C./ 2 hours/ $N_2$ ambience | 100° C./ 24 hours/ pH of 12 | Performed | 1.0008 | 135 | 5% | 1.0075 |
| Example [4] | TiO2/ 80 nm | 120° C./ 24 hours/ pH of 12.5 | 870° C./ 2 hours/ atmosphere | 100° C./ 16 hours/ pH of 12.5 | None | 1.0005 | 200 | 7% | 1.0104 |
| Example [5] | TiO2/ 80 nm | 120° C./ 24 hours/ pH of 12.5 | 870° C./ 2 hours/ atmosphere | 100° C./ 16 hours/ pH of 12.5 | Performed | 1.0003 | 190 | 7% | 1.0092 |
| Example [6] | TiO2/ 10 nm | 115° C./ 8 hours/ pH of 13.5 | 780° C./ 3 hours/ atmosphere | 100° C./ 8 hours/ pH of 12.5 | None | 0.9998 | 95 | 7% | 1.0082 |
| Comparative Example [4] | TiO2/ 10 nm | 115° C./ 8 hours/ pH of 13.5 | 780° C./ 3 hours/ atmosphere | 100° C./ 8 hours/ pH of 12.5 | Performed | 0.9998 | 90 | 7% | 1.0070 |
| Comparative Example [5] | TiO2/ 90 nm | 130° C./ 36 hours/ pH of 13.5 | 780° C./ 3 hours/ atmosphere | 100° C./ 8 hours/ pH of 12.5 | None | 0.9998 | 95 | 7% | 1.0070 |

TABLE 2-continued

| | $\epsilon_r$ | Tan δ (%) | Mean time to failure (minutes) in accelerated longevity test | Pass/fail in accelerated longevity test [y ≥ 20 × ^(−5)] |
|---|---|---|---|---|
| Comparative Example [2] | 3,380 | 8.50% | 130 | X |
| Comparative Example [3] | 2,330 | 10.50% | 100 | X |
| Example [2] | 3,370 | 3.60% | 1,200 | ○ |
| Example [3] | 3,070 | 4.50% | 2,050 | ○ |
| Example [4] | 3,640 | 4.50% | 890 | ○ |
| Example [5] | 3,280 | 7.20% | 1,040 | ○ |
| Example [6] | 2,750 | 3.50% | 2,370 | ○ |
| Comparative Example [4] | 3,920 | 18.50% | 70 | X |
| Comparative Example [5] | 3,560 | 21.00% | 85 | X |

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-080788, filed Mar. 30, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A ceramic powder that contains sintered barium titanate powder having a perovskite structure with a median size of 200 nm or smaller as measured by SEM observation, wherein the barium titanate powder is such that the percentage of barium titanate particles having twin defects in the barium titanate powder is less than 10% as measured by TEM observation and that its crystal lattice c/a is 1.0075 or more.

2. A ceramic powder according to claim 1, wherein the percentage of barium titanate particles having twin defects in the barium titanate powder is 5 to 9%.

3. A ceramic powder according to claim 1, wherein the crystal lattice c/a of the barium titanate powder is 1.0075 to 1.0104.

4. A ceramic powder according to claim 2, wherein the crystal lattice c/a of the barium titanate powder is 1.0075 to 1.0104.

5. A ceramic powder according to claim 1, wherein the average particle size of the barium titanate powder is 80 to 150 nm.

6. A ceramic powder according to claim 2, wherein the average particle size of the barium titanate powder is 80 to 150 nm.

7. A ceramic powder according to claim 3, wherein the average particle size of the barium titanate powder is 80 to 150 nm.

8. A ceramic powder according to claim 4, wherein the average particle size of the barium titanate powder is 80 to 150 nm.

* * * * *